(12) United States Patent
Xiong et al.

(10) Patent No.: US 10,834,717 B2
(45) Date of Patent: Nov. 10, 2020

(54) INTERRUPTED TRANSMISSION INDICATION FOR NEW RADIO (NR)

(71) Applicant: INTEL CORPORATION, Santa Clara, CA (US)

(72) Inventors: Gang Xiong, Portland, OR (US); Sergey Panteleev, Nizhny Novgorod (RU); Hong He, Sunnyvale, CA (US); Debdeep Chatterjee, San Jose, CA (US); Yushu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/296,083

(22) Filed: Mar. 7, 2019

(65) Prior Publication Data

US 2019/0208507 A1 Jul. 4, 2019

Related U.S. Application Data

(60) Provisional application No. 62/644,260, filed on Mar. 16, 2018.

(51) Int. Cl.
| | | |
|---|---|---|
| *H04W 72/04* | (2009.01) | |
| *H04L 29/08* | (2006.01) | |
| *H04W 76/27* | (2018.01) | |
| *H04L 5/00* | (2006.01) | |
| *H04W 4/70* | (2018.01) | |
| *H04W 48/12* | (2009.01) | |
| *H04L 1/00* | (2006.01) | |
| *H04W 88/02* | (2009.01) | |

(52) U.S. Cl.
CPC ......... *H04W 72/042* (2013.01); *H04L 1/0061* (2013.01); *H04L 5/0053* (2013.01); *H04L 5/0078* (2013.01); *H04L 5/0098* (2013.01); *H04L 69/324* (2013.01); *H04W 4/70* (2018.02); *H04W 48/12* (2013.01); *H04W 76/27* (2018.02); *H04W 88/02* (2013.01)

(58) Field of Classification Search
CPC ..... H04W 72/042; H04W 4/70; H04W 76/27; H04L 1/0061; H04L 5/0053
See application file for complete search history.

(56) References Cited

U.S. PATENT DOCUMENTS

2013/0114587 A1* 5/2013 Khoryaev ........... H04L 27/2657
370/343
2014/0105162 A1* 4/2014 Li ....................... H04W 72/042
370/329

(Continued)

OTHER PUBLICATIONS

3GPP TS 38.213 V15.0.0; NR; Physical layer procedures for control (Release 15); Valbonne France (Dec. 2017).

*Primary Examiner* — Jael M Ulysse
(74) *Attorney, Agent, or Firm* — Alliance IP, LLC

(57) ABSTRACT

Technology for a user equipment (UE) operable for interrupted transmission indication is disclosed. The UE can be configured to decode, at the UE, control information carried by a physical downlink control channel (PDCCH) in a first active bandwidth part (BWP). The UE can be configured to identify, at the UE, an interrupted transmission (INT) indicator from the control information in the first active BWP. The UE can be configured to determine, at the UE, a location of an INT indicator for a second active BWP from the INT indicator for the first active BWP.

26 Claims, 17 Drawing Sheets

(56) References Cited

U.S. PATENT DOCUMENTS

| | | | |
|---|---|---|---|
| 2015/0031410 A1* | 1/2015 | Lim | H04W 52/244 |
| | | | 455/522 |
| 2016/0205664 A1* | 7/2016 | Zhang | H04L 1/02 |
| | | | 370/312 |
| 2017/0367046 A1* | 12/2017 | Papasakellariou | H04L 5/0048 |
| 2018/0042028 A1* | 2/2018 | Nam | H04B 7/0626 |
| 2018/0063865 A1* | 3/2018 | Islam | H04L 5/0087 |
| 2018/0145818 A1* | 5/2018 | Choi | H04L 5/0051 |
| 2018/0183551 A1* | 6/2018 | Chou | H04L 5/001 |
| 2018/0184424 A1* | 6/2018 | Wang | H04L 1/1893 |
| 2018/0192383 A1* | 7/2018 | Nam | H04L 5/0092 |
| 2018/0227939 A1* | 8/2018 | Bagheri | H04L 5/0064 |
| 2018/0262311 A1* | 9/2018 | Wang | H04L 5/0096 |
| 2018/0343653 A1* | 11/2018 | Guo | H04L 5/0053 |
| 2018/0368116 A1* | 12/2018 | Liao | H04L 5/0053 |
| 2019/0053159 A1* | 2/2019 | Wei | H04W 76/28 |
| 2019/0059093 A1* | 2/2019 | Cheng | H04W 72/1273 |
| 2019/0132109 A1* | 5/2019 | Zhou | H04W 72/042 |
| 2019/0132862 A1* | 5/2019 | Jeon | H04L 5/0092 |
| 2019/0132882 A1* | 5/2019 | Li | H04L 27/2607 |
| 2019/0150123 A1* | 5/2019 | Nogami | H04L 5/0053 |
| | | | 370/330 |
| 2019/0150183 A1* | 5/2019 | Aiba | H04L 5/0053 |
| | | | 370/336 |
| 2019/0246395 A1* | 8/2019 | Huang | H04L 5/0003 |
| 2019/0261405 A1* | 8/2019 | Ang | H04L 5/0096 |

\* cited by examiner

```
-- ASN1START
-- TAG-DOWNLINKPREEMPTION-START
-- Configuration of downlink preemption indication on PDCCH.
DownlinkPreemption ::=                              SEQUENCE {
        -- RNTI used for indication pre-emption in DL.
        -- Corresponds to L1 parameter 'INT-RNTI', where "INT" stands for
"interruption" (see 38.213, section 10)
        int-RNTI                                    RNTI-Value,
        -- Set selection for DL-preemption indication. Corresponds to L1 parameter
'int-TF-unit' (see 38.213, section 10.1)
        -- The set determines how the UE interprets the DL preemption DCI payload.
        timeFrequencySet                            ENUMERATED {set0,
set1},
        -- Total length of the DCI payload scrambled with INT-RNTI. The value must
be an integer multiple of 14 bit.
        -- Corresponds to L1 parameter 'INT-DCI-payload-length' (see 38.213, section
11.2)
        dci-PayloadSize                             INTEGER
(0..maxINT-DCI-PayloadSize),
        -- Indicates (per serving cell) the position of the 14 bit INT values inside the
DCI payload.
        -- Corresponds to L1 parameter 'INT-cell-to-INT' and 'cell-to-INT' (see 38.213,
section 11.2)
        int-ConfigurationPerServingCell             SEQUENCE (SIZE
(1..maxNrofServingCells)) OF INT-ConfigurationPerServingCell,
        -- Indicates (per serving cell and per BWP) the position of the 14 bit INT
values inside the DCI payload.
        int-ConfigurationPerServingCellPerBwp       SEQUENCE (SIZE
(1..maxNrofServingCells)) OF INT-ConfigurationPerServingCellPerBwp,
        ...
}
```

FIG. 3c

```
INT-ConfigurationPerServingCell ::=          SEQUENCE {
    servingCellId                            ServCellIndex,
    -- Starting position (in number of bit) of the 14 bit INT value applicable for
this serving cell (servingCellId) within the DCI
    -- payload. Must be multiples of 14 (bit). Corresponds to L1 parameter 'INT-
values' (see 38.213, section 11.2)
    positionInDCI                            INTEGER
(0..maxINT-DCI-PayloadSize-1)
}
```

FIG. 3d

```
INT- ConfigurationPerServingCellPerBwp::=      SEQUENCE {
    servingCellId
    ServCellIndex, int-ConfigurationPerBwp                    SEQUENCE
(SIZE (1..maxNrofBWPs)) OF INT-ConfigurationPerBwp,
}
```

FIG. 3e

```
INT-ConfigurationPerBwp::=                              SEQUENCE {
    bwp-Id
    Bwp-Id,
    -- Starting position (in number of bit) of the 14 bit INT value
applicable for this serving cell (servingCellId) within the DCI
    -- payload. Must be multiples of 14 (bit). Corresponds to L1
parameter 'INT-values' (see 38.213, section 11.2)
    positionInDCI                                       INTEGER
(0..maxINT-DCI-PayloadSize-1)
}
```

FIG. 3f

<Alternative ASN.1 for INT- ConfigurationPerBwp> given the fixed 14-bit field size.

INT- ConfigurationPerBwp::=           SEQUENCE {
    bwp-Id
    Bwp-Id, indexOfFormat2-1
    INTEGER(0..maxINT-DCI-PayloadSize-1),
}

-- TAG-DOWNLINKPREEMPTION-STOP

-- ASN1STOP

FIG. 3g

```
INT- ConfigurationPerServingCellPerBwp::=
      SEQUENCE {
             int-RNTI                                          BIT
STRING (SIZE (16)),

INTERRUPTED TRANSMISSION INDICATION FOR NEW RADIO (NR)

RELATED APPLICATIONS

The present application claims the benefit of U.S. Provisional Patent Application No. 62/644,260 filed Mar. 16, 2018, the entire specification of which is hereby incorporated by reference in its entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3c depicts functionality of a user equipment (UE) operable for interrupted transmission indication in accordance with an example;

FIG. 3d depicts functionality of a user equipment (UE) operable for interrupted transmission indication in accordance with an example;

FIG. 3e depicts functionality of a user equipment (UE) operable for interrupted transmission indication in accordance with an example;

FIG. 3f depicts functionality of a user equipment (UE) operable for interrupted transmission indication in accordance with an example;

FIG. 3g depicts functionality of a user equipment (UE) operable for interrupted transmission indication in accordance with an example;

FIG. 3h depicts functionality of a user equipment (UE) operable for interrupted transmission indication in accordance with an example;

Figure 1:
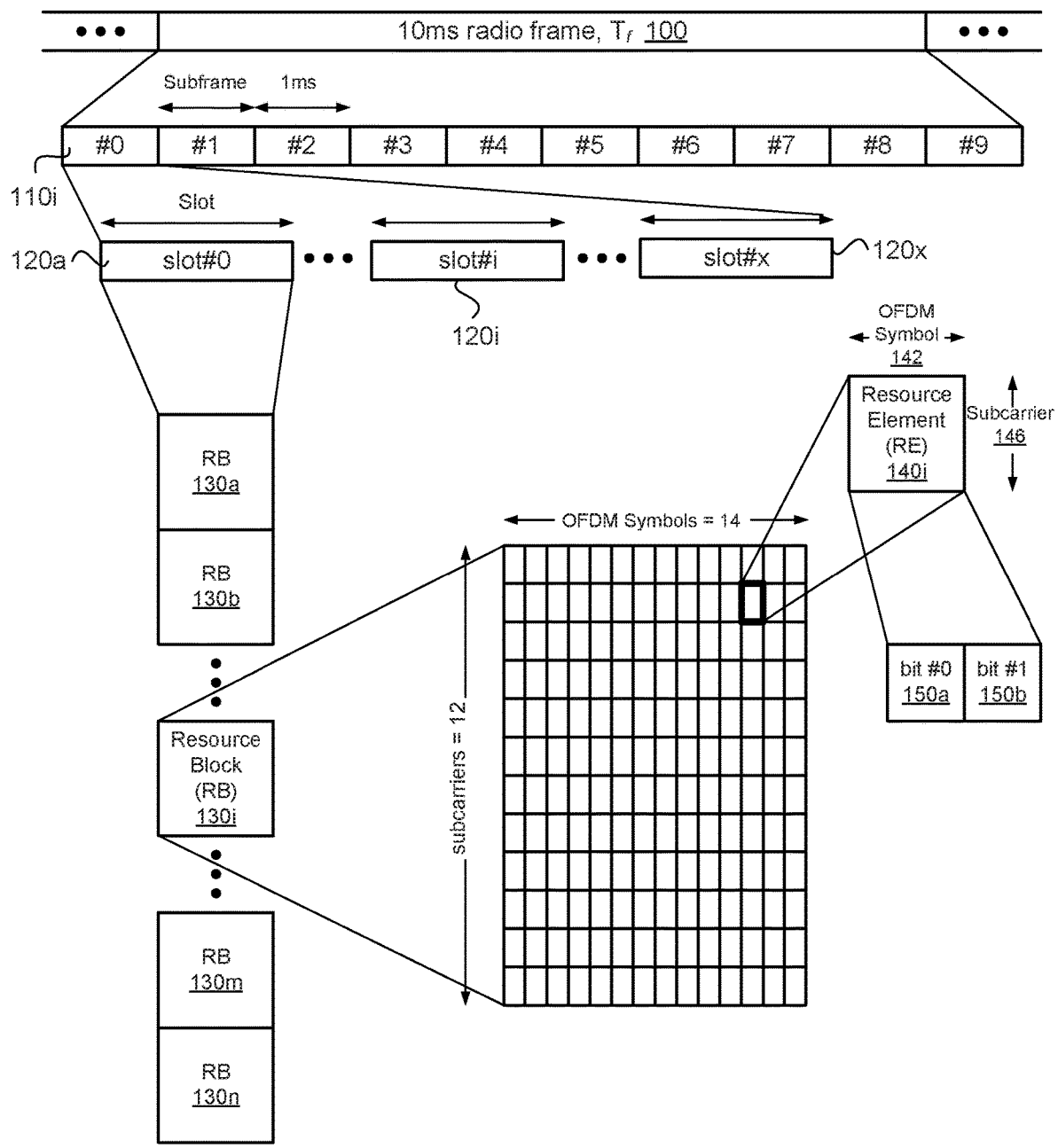
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example, a user equipment (UE) can be configured to receive control information or data in one active downlink (DL) bandwidth part (BWP) and transmit control information or data in one active uplink (UL) BWP. From a set of configured UL and DL BWPs for a UE, one UL BWP and one DL BWP can be active for a provided time instance. An UL BWP and DL BWP can include a numerology, frequency location, and bandwidth. Typically, a UE can only receive or transmit within active DL or UL bandwidth parts using an associated numerology.

However, in a situation in which a UE can be configured with multiple active UL BWPs or multiple active DL BWPs, different active BWPs can be configured with different numerologies. When multiple active UL BWPs or multiple active DL BWPs are configured for a UE, it is desirable for the UE to only monitor a common search space within one active BWP to reduce power consumption, especially in the case of interrupted transmission indication.

In one example, a UE can be operable for interrupted transmission indication. The UE can be configured to decode control information carried by a physical downlink control channel (PDCCH) in a first active bandwidth part (BWP). The UE can be configured to identify an interrupted transmission (INT) indicator from the control information in the first active BWP. The UE can be configured to determine a location of an INT indicator for a second active BWP from the INT indicator for the first active BWP.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Mobile communication has evolved significantly from early voice systems to contemporary integrated communication platforms. The next generation wireless communication systems (e.g., 5G or new radio (NR)) can provide access to information and sharing of data by various users and applications. NR can be designed as a unified system and network with different services. NR can evolve beyond Third-Generation Partnership Project (3GPP) Long Term Evolution (LTE) Advanced with additional Radio Access Technologies (RATs).

In one example, the maximum channel bandwidth for an NR carrier can be 400 mega-hertz (MHz). When a user equipment (UE) does not support the carrier bandwidth, resource allocation for data communication can be based on a frequency-domain assignment process that includes bandwidth part (BWP) configuration and physical resource block (PRB) indication within a BWP. For a UE, one or more BWP configurations for each component carrier (CC) can be semi-statically signaled to the UE. In one example, BWP configuration can include one or more of numerology (e.g., subcarrier spacing, symbol length, or cyclic prefix (CP) duration), frequency location, or bandwidth.

In one example, for a provided time duration for a UE, one downlink (DL) BWP and one uplink (UL) BWP can be active from the set of configured BWPs. In one example, a UE may only receive or transmit within the active DL BWP or the active UL BWP using an associated numerology.

Figure 2:
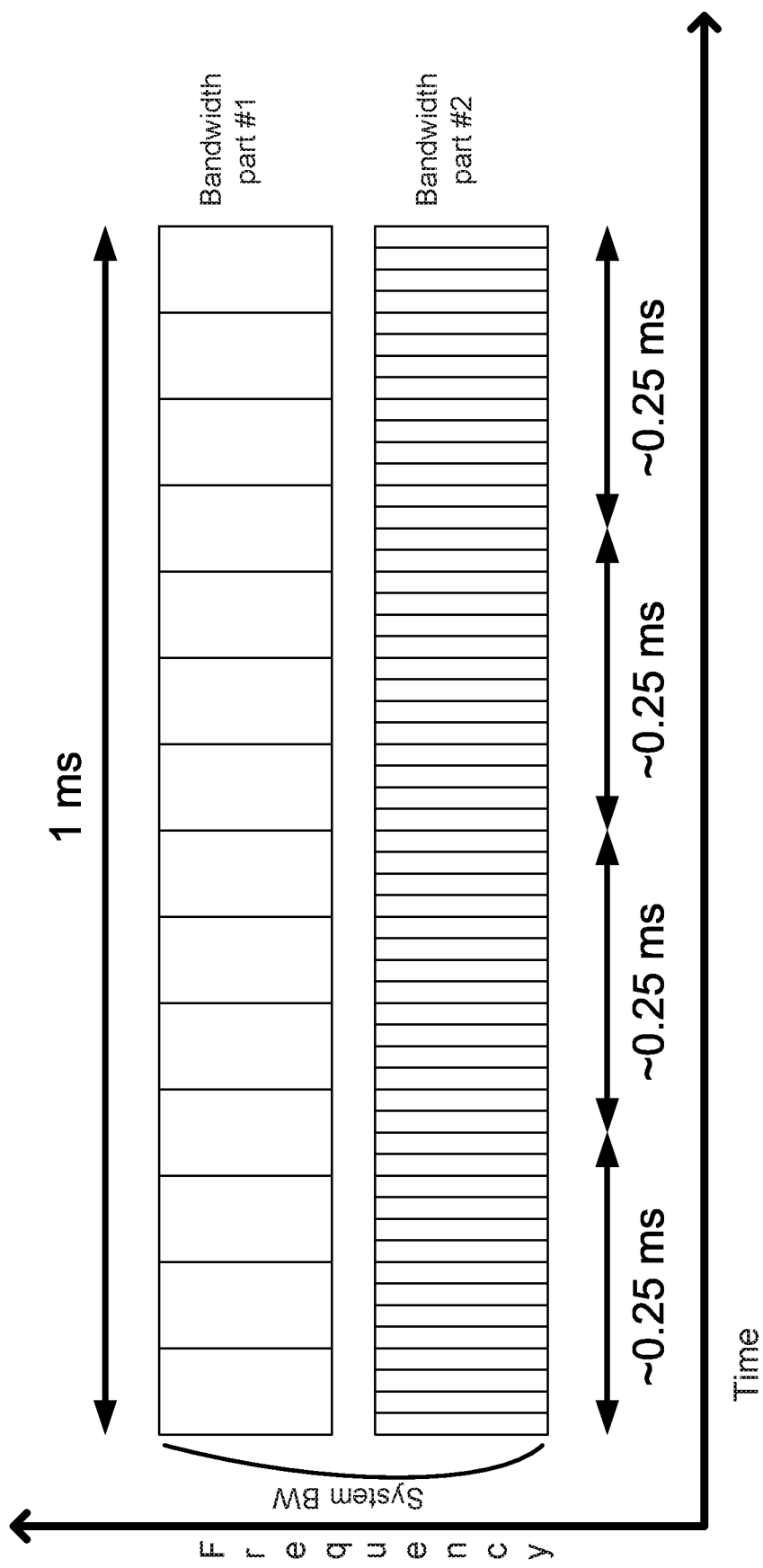
FIG. 2 illustrates multiple bandwidth parts (BWPs) with different numerologies in accordance with an example.

In one example, as illustrated in FIG. 2, a system bandwidth can include a bandwidth part #1 and a bandwidth part #2. The bandwidth part #1 can be configured with 15 kilohertz (kHz) subcarrier spacing and a slot duration of 1 millisecond (ms). The slot duration for bandwidth part #1 can include 14 symbols. The bandwidth part #2 can be configured with 60 kHz subcarrier spacing and a slot duration of approximately 0.25 ms. The slot duration for bandwidth part #2 can include 14 symbols. In one example, different subcarrier spacings with the same cyclic prefix (CP) overhead can have symbol level alignment within a subframe duration.

In one example, a UE can support and can be configured with multiple active bandwidth parts, wherein different active bandwidth parts can be used for different applications and use cases. In one example, a first active bandwidth part (e.g., bandwidth part #1) can be used for Enhanced Mobile Broadband (eMBB), while a second active bandwidth part (e.g., bandwidth part #2) can be used for Ultra-Reliable and Low Latency Communications (URLLC). In one example, different active bandwidth parts can be configured with the same numerologies or different numerologies (e.g., bandwidth part #1 and bandwidth part #2).

In one example, preemption indication or interrupted transmission indication can be monitored in a type 3 physical downlink control channel (PDCCH) common search space (CSS) for a downlink control information (DCI) format with a cyclic redundancy check (CRC) scrambled by an interrupted radio network temporary identifier (INT-RNTI). In one example, cross-carrier indication can be used for interrupted transmission indication of different cells.

In one example, when multiple active bandwidth parts are configured for a UE, the UE can reduce power consumption by monitoring a common search space within one active bandwidth part.

In one example, multiple active bandwidth parts can be configured for a UE. In one example, as previously discussed, different active bandwidth parts with the same or different numerologies can be used for different applications and use cases. In one example, a UE can be configured to decode control information carried by a PDCCH in a first active bandwidth part. The UE can be further configured to identify an interrupted transmission (INT) indicator from the control information in the first active bandwidth part.

In one example, cross-BWP indication can be used for interrupted transmission indication for different active bandwidth parts. In one example, the UE can be configured to determine a location of an INT indicator for a second active bandwidth part from the INT indicator for the first active bandwidth part.

In one example, a UE may only monitor a PDCCH common search space (CSS) for a downlink control information (DCI) format 2_1 (with a CRC scrambled by INT-RNTI) in one BWP, which can result in reduced power consumption.

In one example, the UE may only monitor the PDCCH CSS for a DCI format 2_1 (with a CRC scrambled by INT-RNTI) in an active bandwidth part (or a bandwidth part index) that is defined based on the active BWP with the lowest index or the highest index in a component carrier (CC). In one example, the active BWP with the lowest index can be used for transmission of the PDCCH that can carry interrupted transmission indication for the other active BWPs of the CC. In one example, the active BWP with the highest index can be used for transmission of the PDCCH that can carry interrupted transmission indication for the other active BWPs of the CC.

In one example, the UE may only monitor the PDCCH CSS for a DCI format 2_1 (with a CRC scrambled by INT-RNTI) in an active bandwidth part (or a bandwidth part index) that is configured by higher layer signaling via NR minimum system information (MSI), NR remaining minimum system information (RMSI), NR other system information (OSI), or radio resource control (RRC) signaling.

In one example, the gNB can configure the UE to monitor DCI format 2_1 in one or more PDCCH common search spaces via dedicated RRC signaling in one or more configured DL BWPs. In one example, when multiple DL BWPs are active, the UE can be configured to monitor PDCCH common search spaces for DCI format 2_1 via RRC signaling.

In one example, when multiple DL BWPs are active and some of the multiple DL BWPs have different numerologies, the active BWP with the lowest subcarrier spacing can be used for transmission of PDCCH carrying interrupted transmission indication. In one example, when multiple DL BWPs are active and some of the multiple DL BWPs have different numerologies, the active BWP with the highest subcarrier spacing can be used for transmission of PDCCH carrying interrupted transmission indication.

In one example, when multiple DL BWPs are active and when the multiple DL BWPs have a single numerology, the active BWP that can be used for cross-carrier indication can be based on BWP index or higher layer signaling as previously discussed.

Figure 3A:
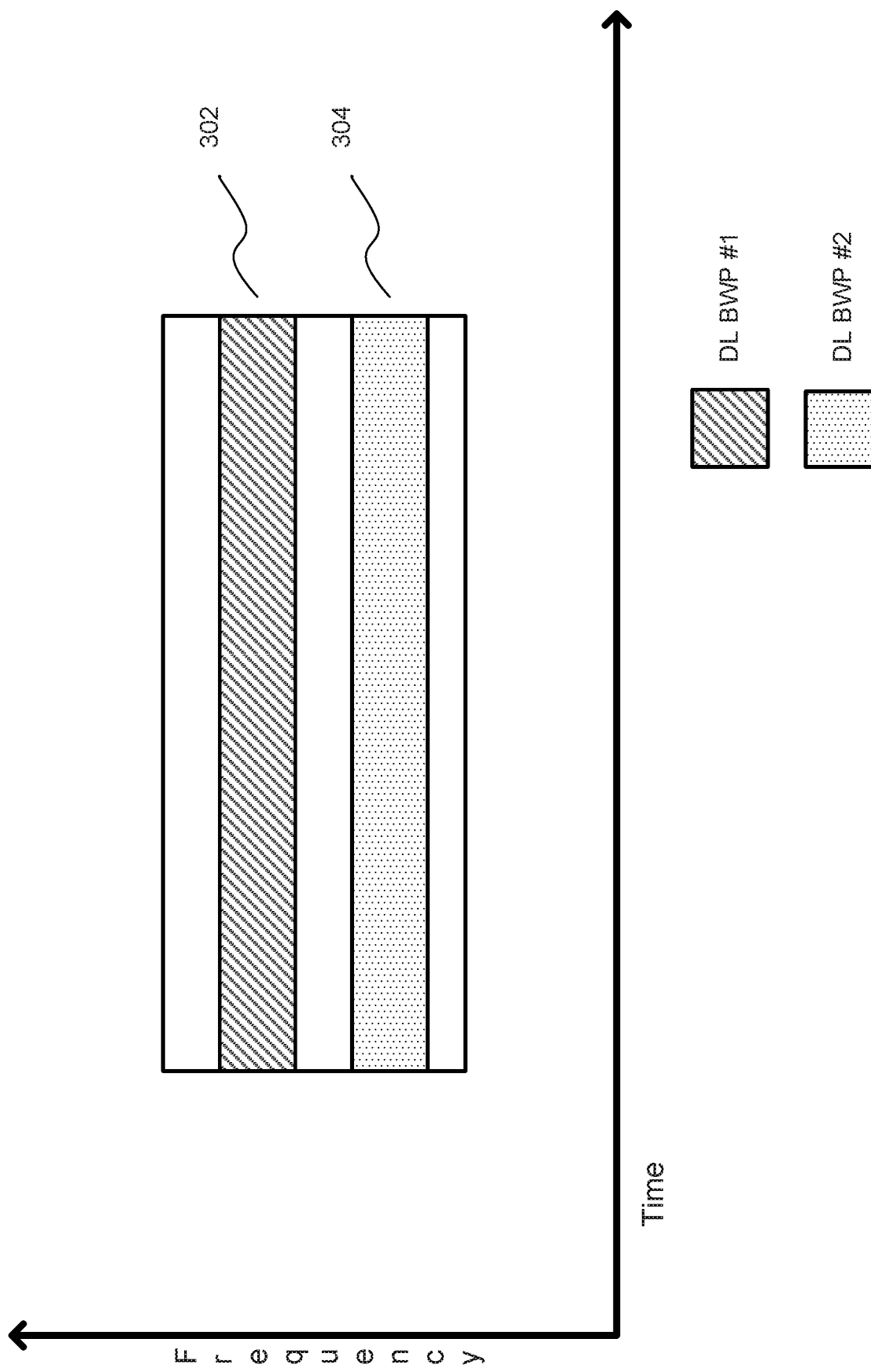
FIG. 3a illustrates bandwidth parts (BWPs) configured for physical downlink control channel (PDCCH) common search space (CSS) monitoring in accordance with an example.

In one example, as illustrated in FIG. 3a, two active bandwidth parts can be configured for PDCCH common search space (CSS) for DCI format 2_1 monitoring. In this example, two or more active BWPs can be configured for a UE. In this example, a first bandwidth part 302 can be configured and used for PDCCH common search space for DCI format 2_1 monitoring. Cross-carrier indication can be used to indicate interrupted transmission from active DL bandwidth part 302 to active DL bandwidth part 304.

In one example, when cross-BWP and/or cross carrier indication is used for interrupted transmission indication for different active BWPs and/or different carriers, a bitmap can be used for interrupted transmission indication of multiple active BWPs. In one example, interrupted transmission information for a plurality of active BWPs can be based on the bitmap from the INT indicator for the first active BWP. The number of symbols corresponding to the reference downlink resource (RDR) for a second active BWP can be provided by $N_{INT}$, wherein $N_{INT}=N_{symb}^{slot} \cdot T_{INT} \cdot 2^{\mu-\mu INT}$, wherein $N_{symb}^{slot}$ can be the number of symbols in a slot, $T_{INT}$ is the PDCCH monitoring periodicity which can be configured by higher layers, $\mu$ can provide the subcarrier spacing for the second active BWP for the serving cell that is indicated according to the mapping in the DCI format 2_1, and $\mu INT$ can provide the subcarrier spacing for the first active BWP. In one example, $N_{symb}^{slot}$ can be 14, $\mu$ can be 2, and $\mu INT$ can be 1. In this example, the number of symbols corresponding to the RDR for the second active BWP can be the product of 28 and $T_{INT}$. In one example, $\mu$ can be 0, 1, 2, 3, or 4, wherein a value of 0 can correspond to a subcarrier spacing of 15 kHz, a value of 1 can correspond to a subcarrier spacing of 30 kHz, a value of 2 can correspond to a subcarrier spacing of 60 kHz, a value of 3 can correspond to a subcarrier spacing of 120 kHz, and a value of 4 can correspond to a subcarrier spacing of 240 kHz. In one example, NINT can be different for different DL BWPs for a serving cell (or component carrier) when the DL BWPs are configured with different subcarrier spacing values.

In one example, a UE can be configured to decode a first value of a higher layer parameter for the first DL BWP and a second value of the higher layer parameter for the second active BWP. The first value of the higher layer parameter can be separately configured from the second value of the higher layer parameter. The higher layer parameter can include interrupted transmission information for the first active BWP or the second active BWP. The higher layer parameter can be the parameter INT-TF-unit. The values of the higher layer parameter can be separately configured for each of the active DL BWPs to align the indication granularity in the time domain. In one example, INT-TF-unit=0 for BWP_A with SCS_A and INT-TF-unit=1 for BWP_B with SCS_B such that SCS_B=SCS_A/2.

In one example, the number of and the order of component carriers and bandwidth parts in an INT indicator can be configured via higher layer signaling. The higher layer signaling can include one or more of: minimum system information (MSI), NR remaining minimum system information (RMSI), NR other system information (OSI), or radio resource control (RRC) signaling. In one example, for different component carriers, the number of configured BWPs can be the same or different. In one example, the one or more component carrier indices and/or the one or more bandwidth part indices can be configured in a UE-specific manner via dedicated RRC signaling. In one example, a UE can decode one or more CC indices or one or more BWP indices in the INT indicator via RRC signaling.

Figure 3B:
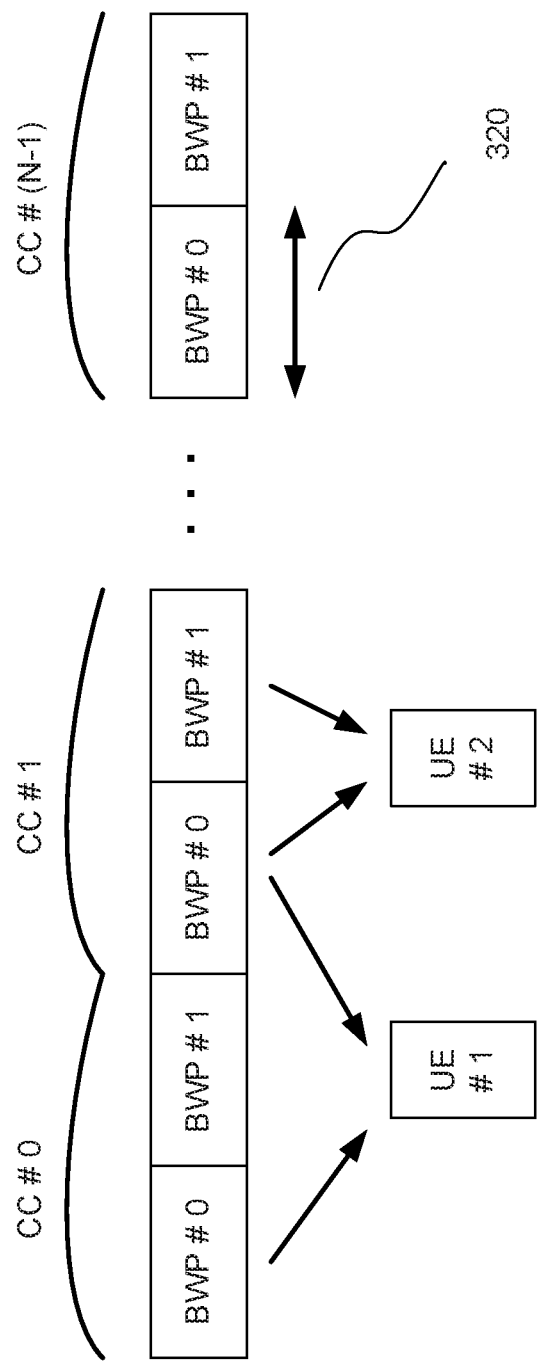
FIG. 3b illustrates multiple bandwidth parts (BWPs) and component carriers (CCs) in accordance with an example.

In one example, as illustrated in FIG. 3b, multiple CCs and multiple BWPs can be used for interrupted transmission indication. In this example, a first component carrier (e.g., CC #0) can include two bandwidth parts (e.g., BWP #0 and BWP #1) configured for interrupted transmission indication, and a second component carrier (e.g., CC #1) can include two bandwidth parts (e.g., BWP #0 and BWP #1) configured for interrupted transmission indication. In this example, a first UE (e.g., UE #1) can decode the interrupted transmission indication for a first BWP (e.g., BWP #0) in a first component carrier (e.g., CC #0) and a second component carrier (e.g., CC #1). In this example, a second UE (e.g., UE #2) can decode the interrupted transmission indication for a first BWP (e.g., BWP #0) and a second BWP (e.g., BWP #1) in a component carrier (e.g., CC #1). In this example, any of the configured BWPs (e.g., BWP #0 and BWP #1 in CC #0, and BWP #0 and BWP #1 in CC #1) can be active.

In one example, as further illustrated in FIG. 3b, a component carrier (e.g., CC #(N−1)) can include two bandwidth parts (e.g., BWP #0 and BWP #1) configured for interrupted transmission indication. In one example, a bandwidth part (e.g., BWP #0 in CC #(N−1)) can include a bitmap 320 for interrupted transmission indication.

In one example, a bitmap can correspond to a pair of a cell identifier (ID) and a BWP ID within a cell.

In one example, as illustrated in FIGS. 3c through 3g, a UE or a gNB can be operable for interrupted transmission indication. 3GPP TS 38.331 V15.0.0 (2018 Jan. 4) section 6.3.2 can be modified as depicted in FIGS. 3c through 3g, wherein proposed modifications are indicated by underlined and bold front. 3GPP TS 38.331 V15.0.0 (2018 Jan. 4) section 6.3.2 can be modified so that each bitmap can correspond to a pair of Cell identifier (Cell ID) and BWP identifier (BWP ID) within a cell. FIGS. 3c, 3e, and 3f depict proposed modifications, while FIG. 3g depicts an alternative proposed modification.

In one example, a maximum configurable payload size of a DCI format (e.g., DCI format 2_1) for interrupted transmission indication can be 126 bits, which can correspond to 9 fields. In one example, an INT indicator in a single DCI format (e.g., DCI format 2_1) may only support 9 bandwidth parts or component carriers for a single UE or for multiple UEs. In one example, a NR UE can be configured with up to 16 CCs and up to 4 BWPs for each CC, which can result in a total of 64 fields for a single UE for flexible interrupted transmission indication.

In one example, a UE can be configured to decode one or more interrupted radio network temporary identifiers (INT-RNTI) for monitoring of downlink control information (DCI) having a format 2_1. In one example, different indices for different BWPs across CCs can be configured by higher layer signaling to associate a respective BWP with a corresponding index in the DCI format 2_1 having CRC parity bits scrambled with the corresponding INT-RNTI. In one example, a radio resource control message can be encoded as depicted in FIG. 3h, with proposed modifications to 3GPP TS 38.331 V15.0.0 (2018 Jan. 4) section 6.3.2 indicated by underlined and bold font.

In one example, a UE can be configured to decode, at the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs. The UE can be further configured to determine, at the UE, from the RRC signal, a selected BWP of the CCs in the cell group for common search space (CSS) monitoring. The UE can be further configured to identify, at the UE, interrupted transmission information from the selected BWP that includes the location of the INT indicator for a remaining number of BWPs in the cell group. In one example, a BWP or CC can be selected and can be signaled to a UE by RRC signaling for type-3 common search space (CSS) monitoring to carry an INT indicator DCI format for all BWPs or CCs in a single cell group.

In one example, a UE can be configured with one or more type-3 PDCCH CSSs for a DCI format with a CRC scrambled by an INT-RNTI. In one example, the type-3 PDCCH CSS can be located in different BWPs or CCs to provide more than 9 INT indicator fields for a single UE.

In one example, a UE can be configured to monitor independent interrupted transmission indication in each active BWP. In one example, for cross-carrier indication, interrupted transmission indication can include the indication the multiple CCs with the same BWP index.

In one example, when the number of active BWPs for a first CC where a UE monitors interrupted transmission indication is greater than the number of active BWPs for a second CC, the interrupted transmission indication for the second CC may not be included for some of the active BWPs. In one example, when a first component carrier (e.g., CC #1) has two active BWPs (e.g., BWP #1 and BWP #2) and a second component carrier (e.g., CC #2) has one active BWP (e.g., BWP #1), interrupted transmission indication for the first active BWP (e.g., BWP #1) can include both the first component carrier and the second component carrier (e.g., CC #1 and CC #2) while interrupted transmission indication for the second active BWP (e.g., BWP #2) can include only the first component carrier (e.g., CC #1).

In one example, in a single CC, a bitmap for interrupted transmission indication can be used to indicate the interrupted transmission indication for a plurality of active BWPs. In one example, a reference downlink resource (RDR) in the frequency domain for interrupted transmission indication can be a union of frequency resources configured for a plurality of active BWPs. For the RDR in the time domain, the RDR can be the minimum or maximum of monitoring periodicity of PDCCH common search space for DCI format 2_1 carrying interrupted transmission indication for different active BWPs. In one example, semi-statically configured UL symbols can be excluded from the RDR.

In one example, in the time domain, the RDR can be based on monitoring periodicity of PDCCH common search space for DCI format 2_1 carrying interrupted transmission indication for the active BWP with the smallest or largest subcarrier spacing or for the active BWP that is configured by higher layers via MSI, RMSI, OSI, or RRC signaling.

In one example, as specified in 3GPP technical specification (TS) 38.213 V15.0.0 (2018 Jan. 3), a UE can monitor PDCCH candidates in a common search space. In one example, a CSS can include a Type0-PDCCH common search space for a DCI format with CRC scrambled by a system information RNTI (SI-RNTI) on a primary cell. In one example, a CSS can include a Type0A-PDCCH common search space for a DCI format with CRC scrambled by an SI-RNTI on a primary cell. In one example, a CSS can include a Type1-PDCCH common search space for a DCI format with CRC scrambled by a random access RNTI (RA-RNTI), a temporary cell RNTI (TC-RNTI), or a cell RNTI (C-RNTI) on a primary cell. In one example, a CSS can include a Type2-PDCCH common search space for a DCI format with CRC scrambled by a paging RNTI (P-RNTI) on a primary cell. In one example, a CSS can include a Type3-PDCCH common search space for a DCI format with CRC scrambled by INT-RNTI, slot format indication RNTI (SFI-RNTI), transmit power control (TPC) physical uplink shared channel RNTI (TPC-PUSCH-RNTI), TPC physical uplink control channel RNTI (TPC-PUCCH-RNTI), TPC sounding reference signal RNTI (TPC-SRS-RNTI), C-RNTI, configured scheduling RNTI (CS-RNTI), TC-RNTI, or semi-persistent channel state information RNTI (SP-CSI-RNTI).

In one example, when a plurality of active BWPs is configured for a UE, the UE can be configured to monitor a common search space within a subset of active BWPs to reduce power consumption.

In one example, for each PDCCH common search space, a UE can be configured to monitor the CSS within the subset of active BWPs, wherein the subset of active BWPs can be configured by higher layer signaling including one or more of MSI, RMSI, OSI, or RRC signaling. In one example, each search space can be associated with a control resource set (CORESET). In one example, the CORESET index and the active BWP index can be configured within each search space set for monitoring a PDCCH common search space.

In one example, when a channel state information reference signal (CSI-RS) is not configured for beam failure detection, a UE can be configured to monitor one or more reference signals that are spatially quasi-co-located with a CORESET with a search space for a DCI format with a CRC scrambled by a cell radio network temporary identifier (C-RNTI).

In one example, when a plurality of active BWPs is configured, a UE can be configured to monitor the CORESETs for unicast physical downlink shared channel (PDSCH) transmission in all or a sub-set of configured active BWPs. In one example, if some CORESETs are spatially quasi-co-located across the active BWPs, only one reference signal quasi-co-located with a particular CORESET can be monitored (e.g., the reference signal quasi-co-located with CORESET with the lowest active BWP index).

Figure 4:
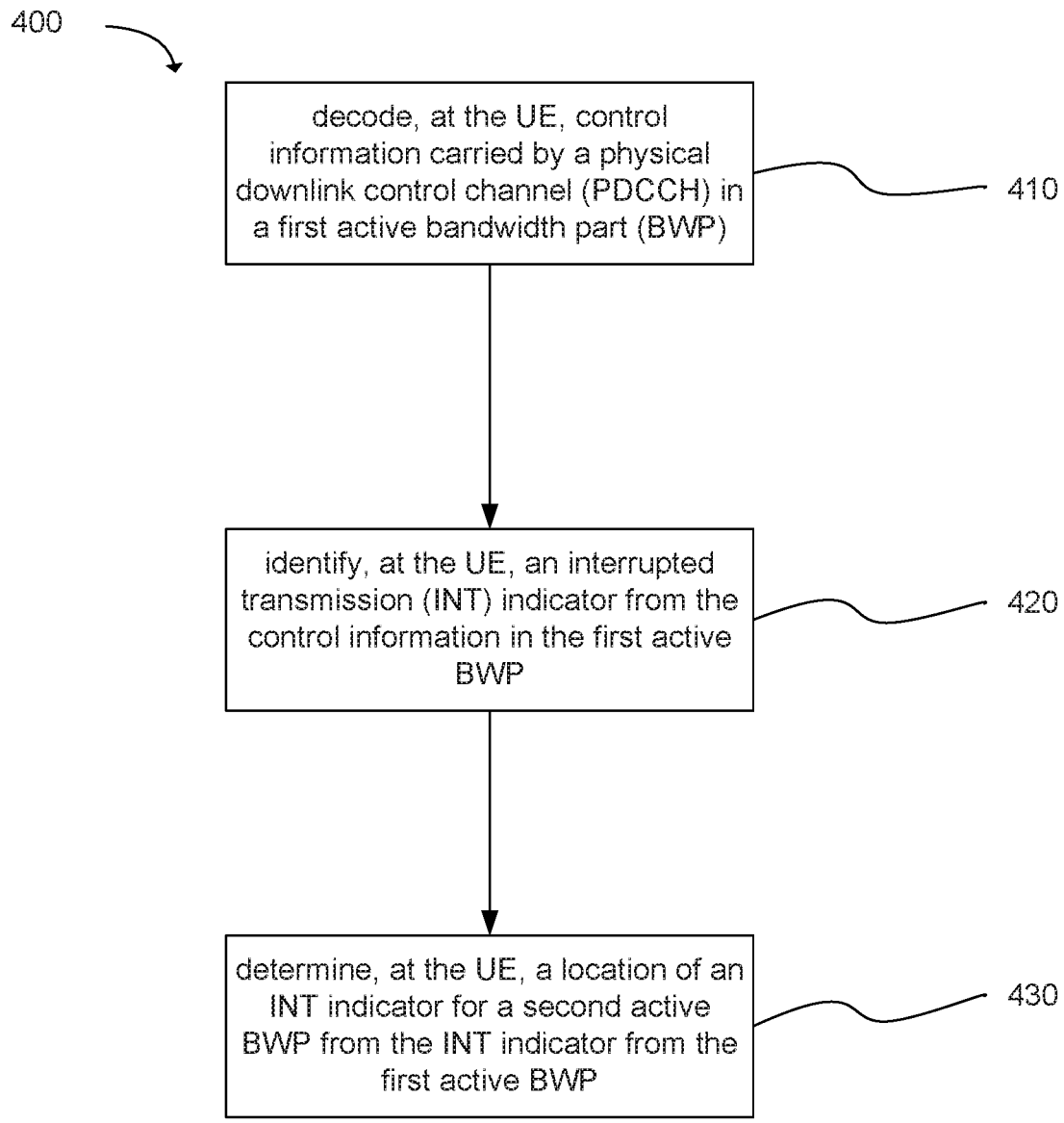
FIG. 4 depicts functionality of a user equipment (UE) operable for interrupted transmission indication in accordance with an example.

Another example provides functionality 400 of a UE operable for interrupted transmission indication, as shown in FIG. 4. The UE can comprise one or more processors. The one or more processors can be configured to decode, at the UE, control information carried by a physical downlink control channel (PDCCH) in a first active bandwidth part (BWP), as in block 410. The one or more processors can be configured to identify, at the UE, an interrupted transmission (INT) indicator from the control information in the first active BWP, as in block 420. The one or more processors can be configured to determine, at the UE, a location of an INT indicator for a second active BWP from the INT indicator for the first active BWP, as in block 430. In addition, the UE can comprise a memory interface configured to send the INT indicator for the first active BWP to a memory.

Figure 5:
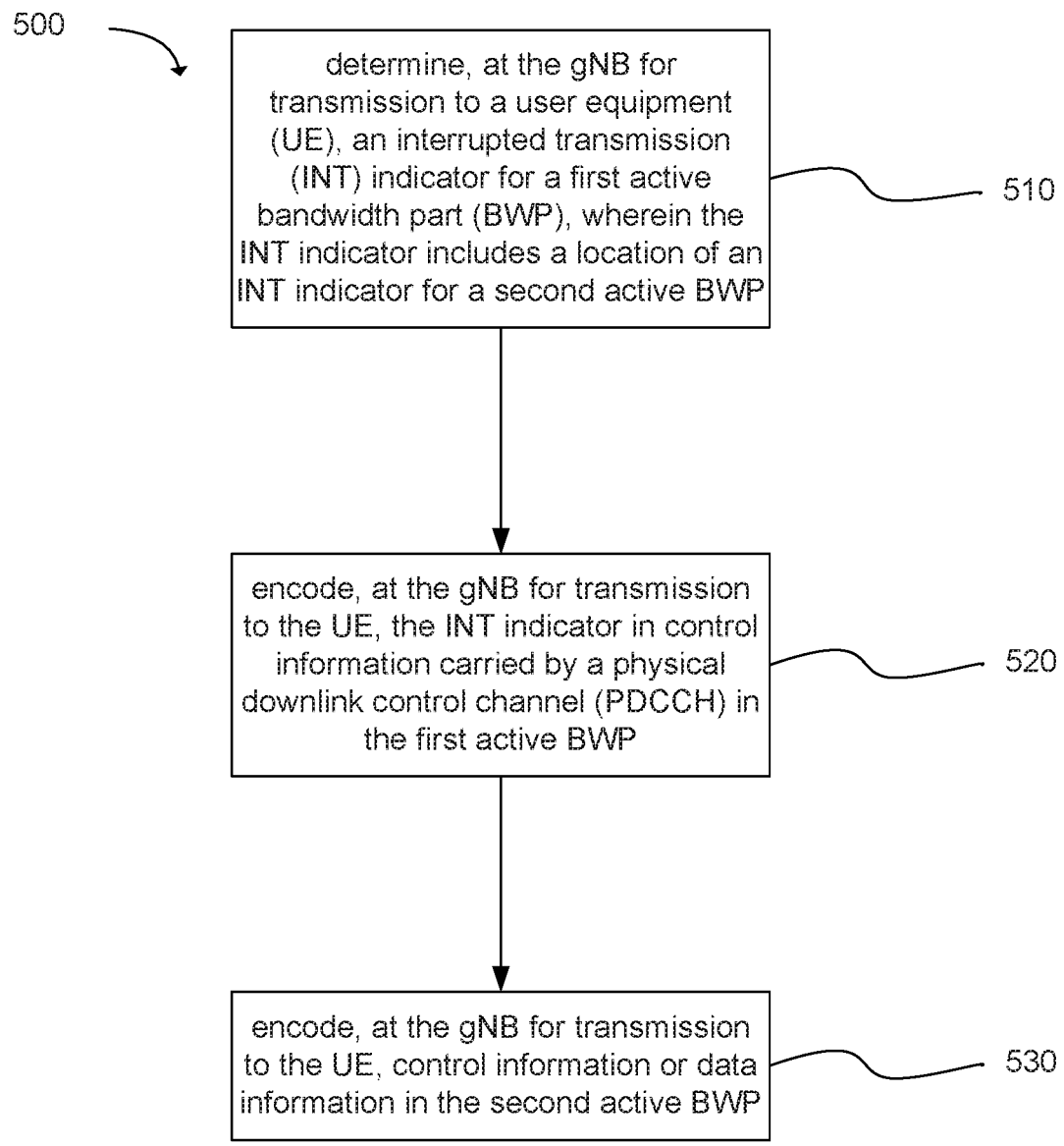
FIG. 5 depicts functionality of a new radio (NR) node B (gNB) operable for interrupted transmission indication in accordance with an example.

Another example provides functionality 500 of a next generation node B (gNB) operable for beam management, as shown in FIG. 5. The gNB can comprise one or more processors. The one or more processors can be configured to determine, at the gNB for transmission to a user equipment (UE), an interrupted transmission (INT) indicator for a first active bandwidth part (BWP), wherein the INT indicator includes a location of an INT indicator for a second active BWP, as in block 510. The one or more processors can be configured to encode, at the gNB for transmission to the UE, the INT indicator in control information carried by a physical downlink control channel (PDCCH) in the first active BWP, as in block 520. The one or more processors can be configured to encode, at the gNB for transmission to the UE, control information or data information in the second active BWP, as in block 530. In addition, the gNB can comprise a memory interface configured to retrieve the INT indicator from a memory.

Figure 6:
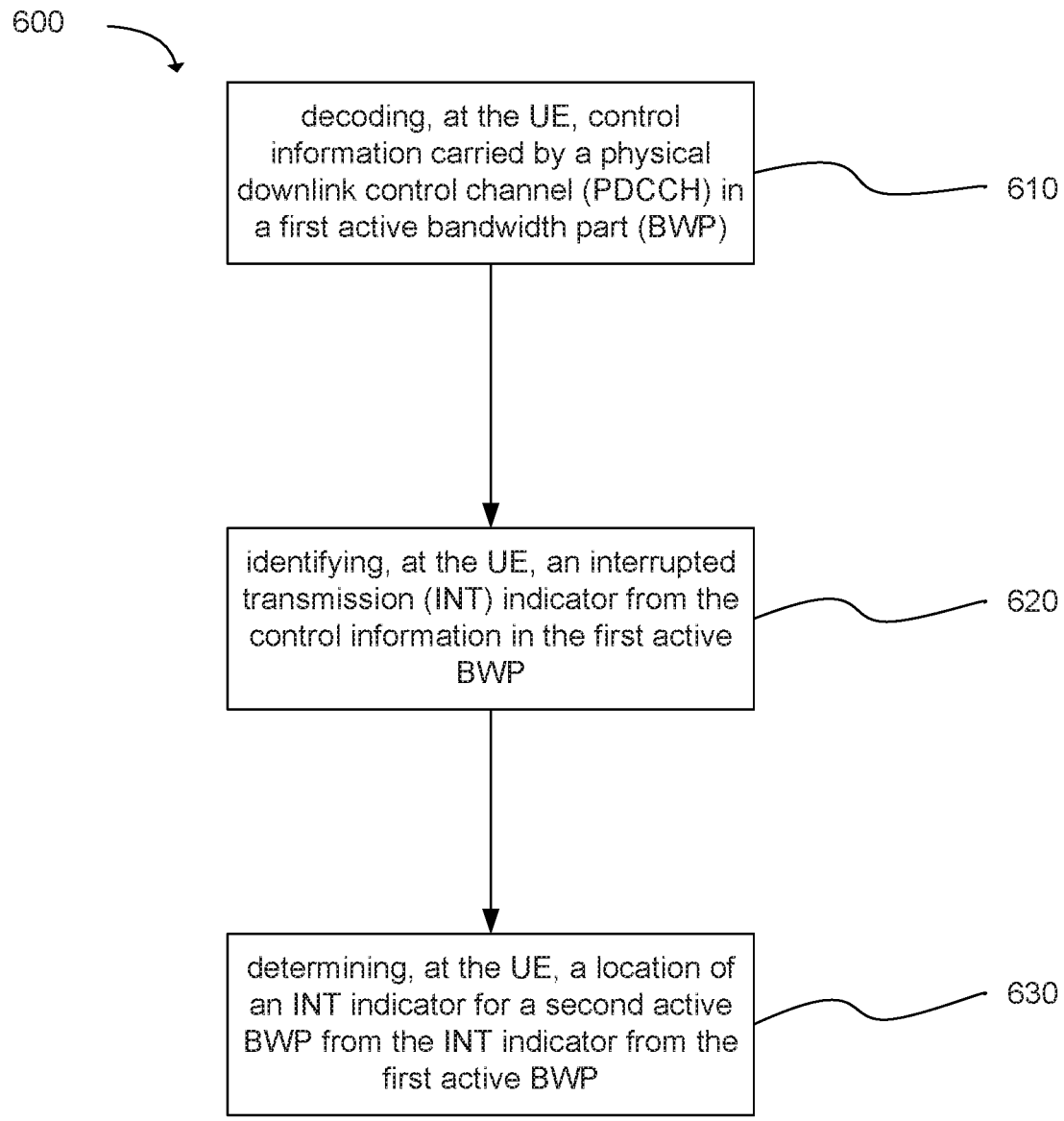
FIG. 6 depicts a flowchart of a machine readable storage medium having instructions embodied thereon for interrupted transmission indication in accordance with an example.

Another example provides at least one machine readable storage medium having instructions 600 embodied thereon for interrupted transmission indication, as shown in FIG. 6. The instructions can be executed on a machine, where the instructions are included on at least one computer readable medium or one non-transitory machine readable storage medium. The instructions when executed perform: decoding, at the UE, control information carried by a physical downlink control channel (PDCCH) in a first active bandwidth part (BWP), as in block 610. The instructions when executed perform: identifying, at the UE, an interrupted transmission (INT) indicator from the control information in the first active BWP, as in block 620. The instructions when executed perform: determining, at the UE, a location of an INT indicator for a second active BWP from the INT indicator from the first active BWP, as in block 630.

While examples have been provided in which a gNB has been specified, they are not intended to be limiting. An evolved node B (eNodeB) can be used in place of the gNB. The gNB can also be referred to as a new radio (NR) base station (BS). Accordingly, unless otherwise stated, any example herein in which a gNB has been disclosed, can similarly be disclosed with the use of an eNodeB or NR BS.

Figure 7:
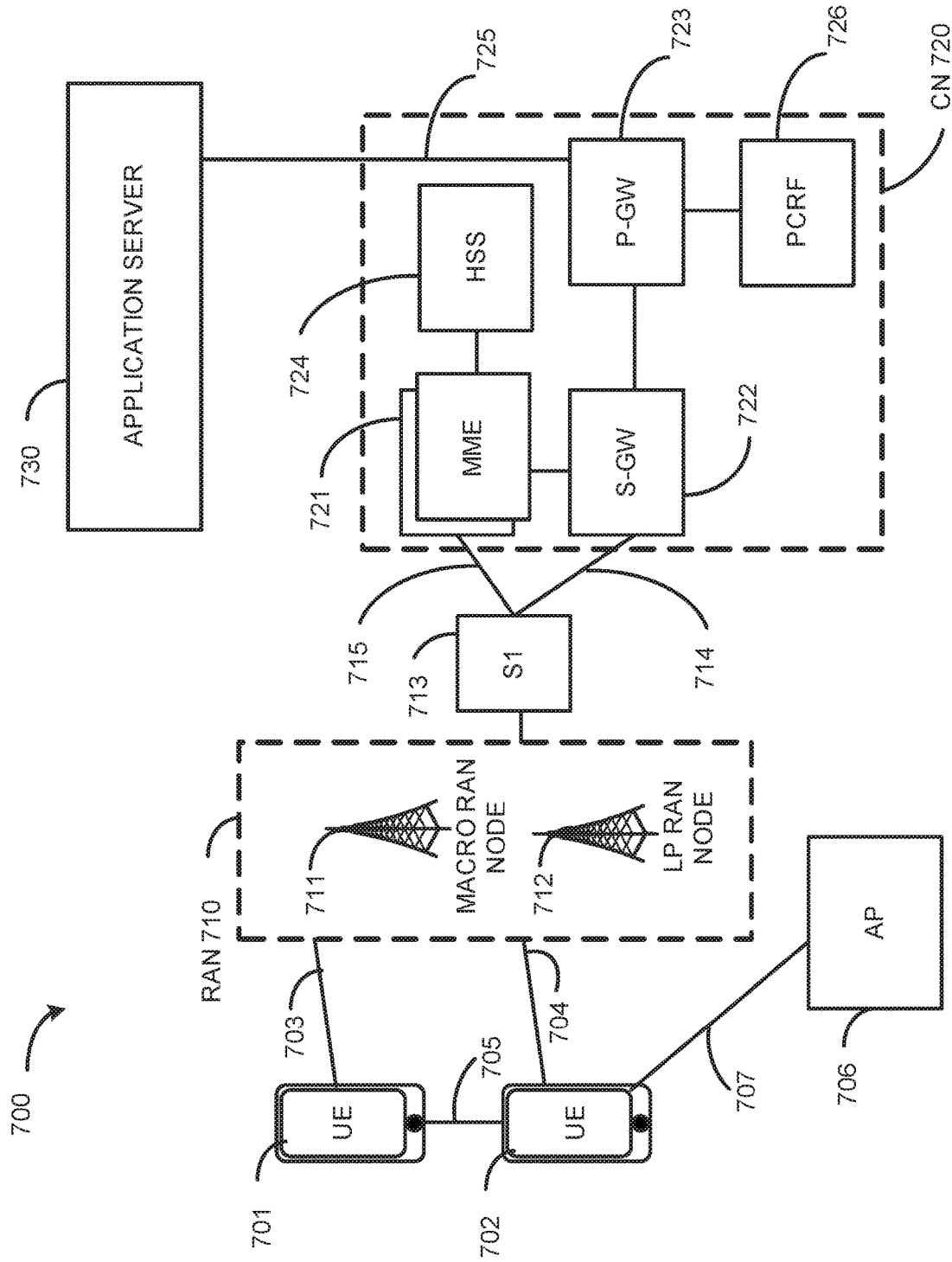
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
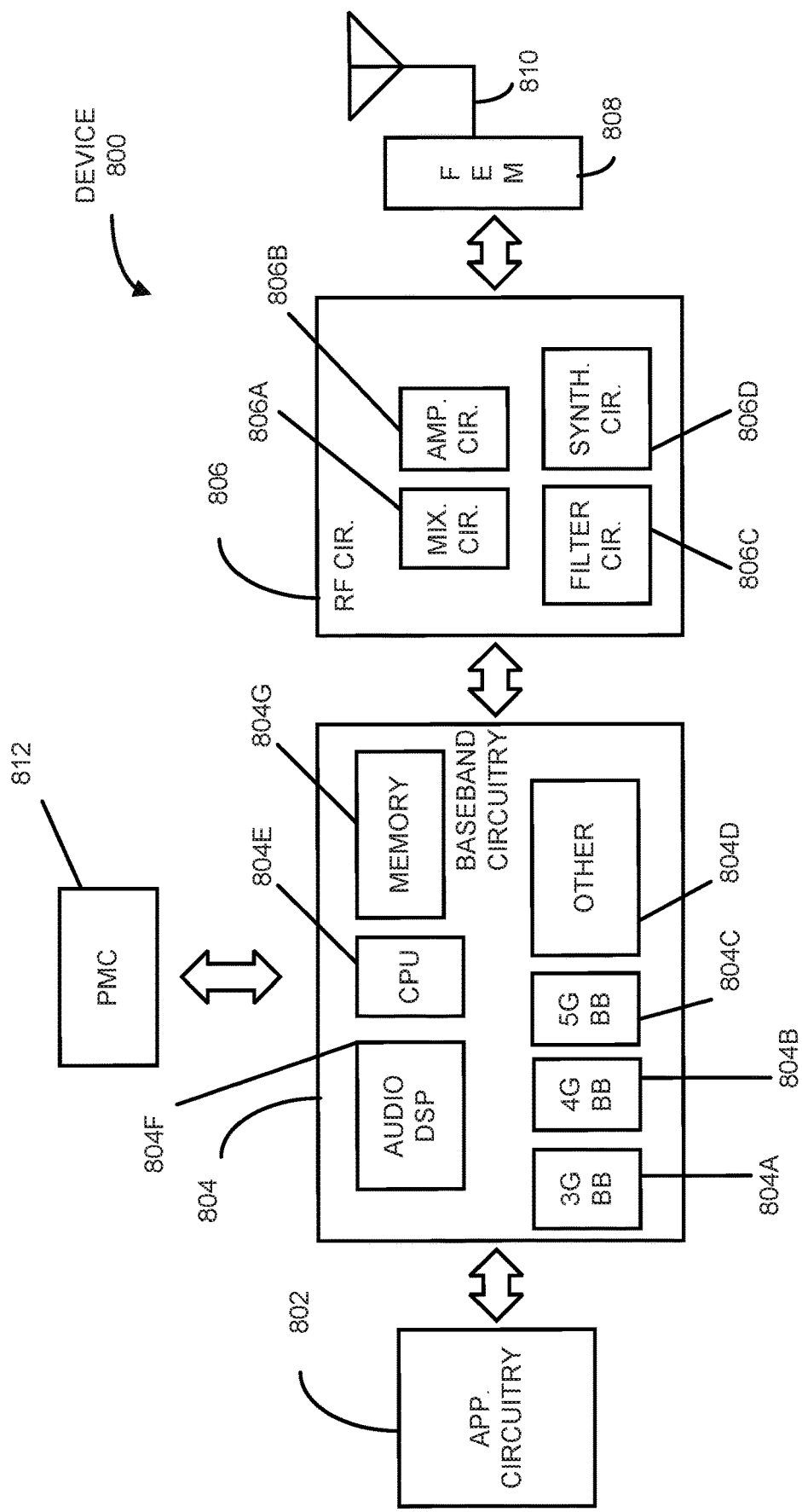
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, or other baseband processor(s) 804*d* for other existing generations, generations in development or to be developed in the future (e.g., second generation (2G), sixth generation (6G), etc.). The baseband circuitry 804 (e.g., one or more of baseband processors 804*a-d*) may handle various radio control functions that enable communication with one or more radio networks via the RF circuitry 806. In other embodiments, some or all of the functionality of baseband processors 804*a-d* may be included in modules stored in the memory 804*g* and executed via a Central Processing Unit (CPU) 804*e*. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
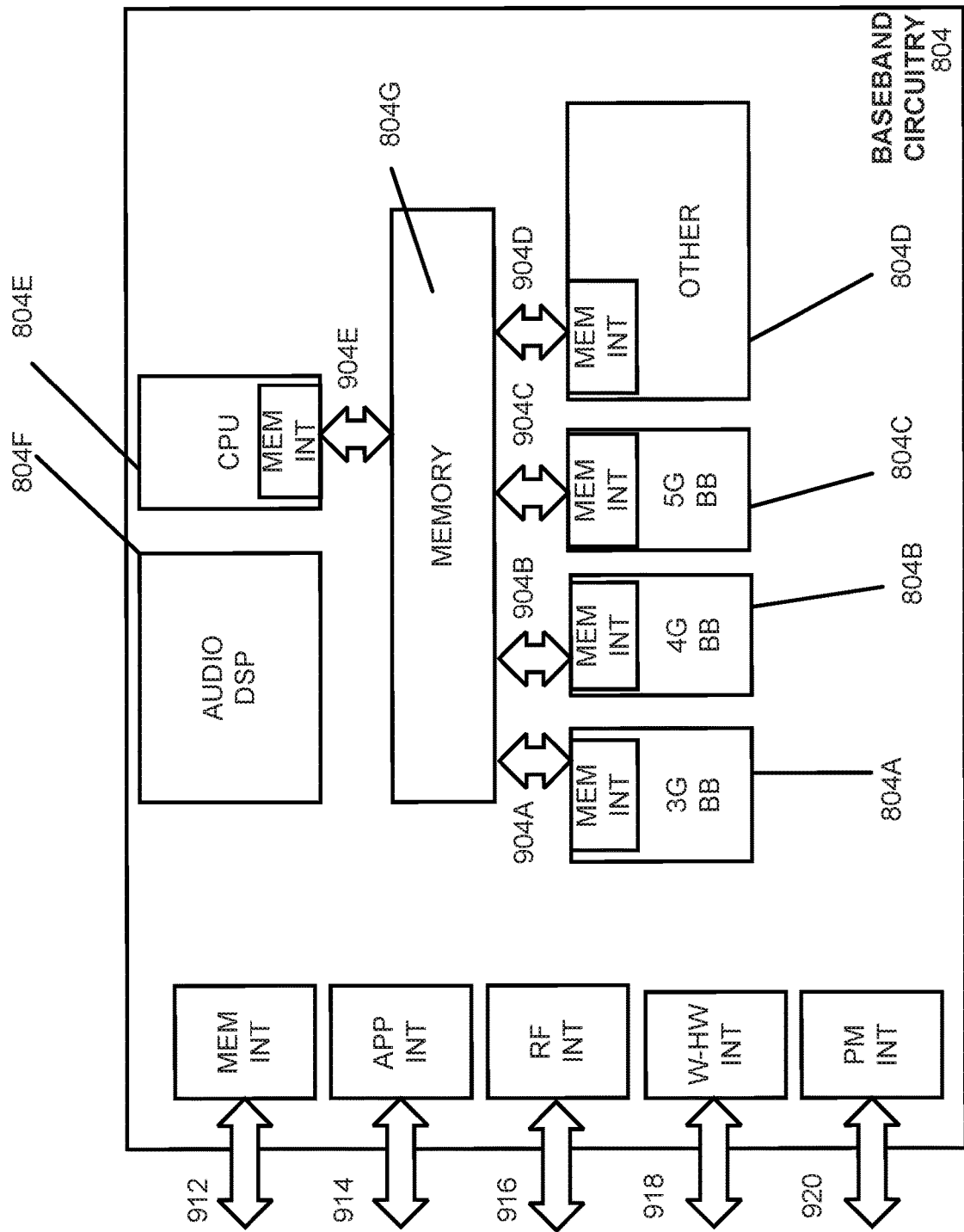
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
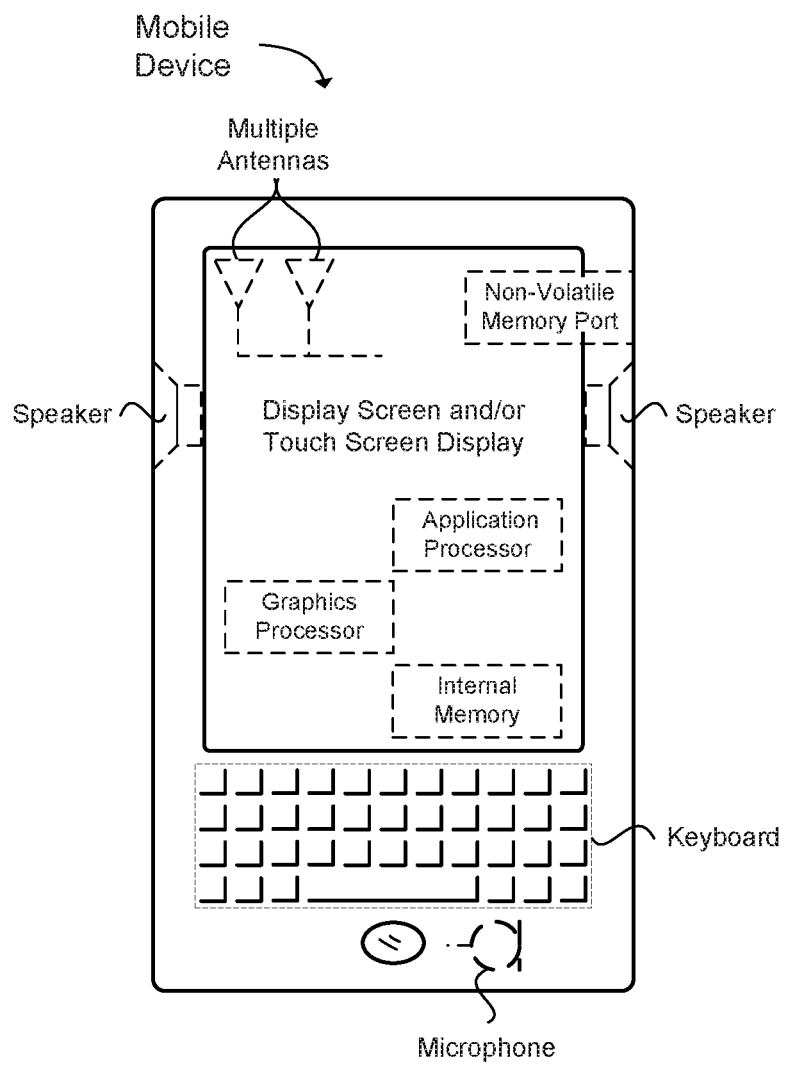
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for interrupted transmission indication, the apparatus comprising: one or more processors configured to: decode, at the UE, control information carried by a physical downlink control channel (PDCCH) in a first active bandwidth part (BWP); identify, at the UE, an interrupted transmission (INT) indicator from the control information in the first active BWP; and determine, at the UE, a location of an INT indicator for a second active BWP from the INT indicator for the first active BWP; and a memory interface configured to send the INT indicator for the first active BWP to a memory.

Example 2 includes the apparatus of claim 1, wherein the one or more processors are further configured to: identify, at the UE, interrupted transmission information for a plurality of active BWPs based on a bitmap from the INT indicator for the first active BWP.

Example 3 includes the apparatus of Example 1, wherein the one or more processors are further configured to: decode, at the UE, a first value of a higher layer parameter for the first BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP.

Example 4 includes the apparatus of Example 1, wherein the one or more processors are further configured to: decode, at the UE, one or more interrupted radio network temporary identifiers (INT-RNTI) for monitoring of downlink control information (DCI) having a format 2_1.

Example 5 includes the apparatus of Example 1, wherein the one or more processors are further configured to: decode, at the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs; determine, at the UE, from the RRC signal, a selected BWP of the CCs in the cell group for common search space (CSS) monitoring; and identify, at the UE, interrupted transmission information from the selected BWP that includes the location of the INT indicator for a remaining number of BWPs in the cell group.

Example 6 includes the apparatus of Example 1, wherein the one or more processors are further configured to: monitor, at the UE, one or more type 3 PDCCH common search spaces (CSSs) for a downlink control information (DCI) having a format with a cyclic redundancy check (CRC) scrambled by an interrupted radio network temporary identifier (INT-RNTI).

Example 7 includes the apparatus of Example 1, wherein the one or more processors are further configured to: decode, at the UE, a number of BWPs or a number of component carriers (CC) and an order of BWPs or an order of CCs in the INT indicator via higher layer signaling, wherein the higher layer signaling is one or more of: minimum system information (MSI); NR remaining minimum system information (RMSI); NR other system information (OSI); or radio resource control (RRC) signaling.

Example 8 includes the apparatus of Example 1, wherein the one or more processors are further configured to: decode, at the UE, one or more BWP indices or one or more component carrier (CC) indices in the INT indicator via radio resource control (RRC) signaling.

Example 9 includes the apparatus of Example 1, wherein the one or more processors are further configured to: monitor, at the UE, a common search space (CSS) within a subset of active BWPs.

Example 10 includes the apparatus of Example 9, wherein the one or more processors are further configured to: monitor, at the UE, the CSS within the subset of active BWPs, wherein the subset of active BWPs is configured by higher layer signaling including one or more of: minimum system information (MSI); NR remaining minimum system information (RMSI); NR other system information (OSI); or radio resource control (RRC) signaling.

Example 11 includes the apparatus of Example 1, wherein the one or more processors are further configured to: monitor, at the UE, one or more reference signals that are spatially quasi-co-located with a control resource set (CORESET) with a search space for a downlink control information (DCI) format with a cyclic redundancy check (CRC) scrambled by cell radio network temporary identifier (C-RNTI).

Example 12 includes an apparatus of a new radio (NR) node B (gNB) operable for interrupted transmission indication, the apparatus comprising: one or more processors configured to: determine, at the gNB for transmission to a user equipment (UE), an interrupted transmission (INT) indicator for a first active bandwidth part (BWP), wherein the INT indicator includes a location of an INT indicator for a second active BWP; encode, at the gNB for transmission to the UE, the INT indicator in control information carried by a physical downlink control channel (PDCCH) in the first active BWP; and encode, at the gNB for transmission to the UE, control information or data information in the second active BWP; and a memory interface configured to retrieve the INT indicator from a memory.

Example 13 includes the apparatus of Example 12, wherein the one or more processors are further configured to: determine, at the gNB, a bitmap in the INT indicator for the first active BWP, wherein the bitmap includes interrupted transmission information for a plurality of active BWPs.

Example 14 includes the apparatus of Example 12, wherein the one or more processors are further configured to: encode, at the gNB for transmission to the UE, a first value of a higher layer parameter for the first active BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP.

Example 15 includes the apparatus of Example 12, wherein the one or more processors are further configured to: encode, at the gNB for transmission to the UE, one or more interrupted radio network temporary identifiers (INT-RNTI) for monitoring of downlink control information (DCI) having a format 2_1.

Example 16 includes the apparatus of Example 12, wherein the one or more processors are further configured to: encode, at the gNB for transmission to the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs.

Example 17 includes the apparatus of Example 12, wherein the one or more processors are further configured to: encode, at the gNB for transmission to the UE, a number of BWPs or a number of component carriers (CCs) and an order of BWPs or an order of CCs in the INT indicator via higher layer signaling, wherein the higher layer signaling is one or more of: minimum system information (MSI); NR remaining minimum system information (RMSI); NR other system information (OSI); or radio resource control (RRC) signaling.

Example 18 includes the apparatus of Example 12, wherein the one or more processors are further configured to: encode, at the gNB for transmission to the UE, one or more BWP indices or one or more component carrier (CC) indices in the INT indicator via radio resource control (RRC) signaling.

Example 19 includes at least one non-transitory machine readable storage medium having instructions embodied thereon for interrupted transmission indication, the instructions when executed by one or more processors at a user equipment (UE) perform the following: decoding, at the UE, control information carried by a physical downlink control channel (PDCCH) in a first active bandwidth part (BWP); identifying, at the UE, an interrupted transmission (INT) indicator from the control information in the first active BWP; and determining, at the UE, a location of an INT indicator for a second active BWP from the INT indicator from the first active BWP.

Example 20 includes the at least one non-transitory machine readable storage medium of Example 19, further comprising instructions that when executed perform: identifying, at the UE, interrupted transmission information for a plurality of active BWPs based on a bitmap from the INT indicator for the first active BWP.

Example 21 includes the at least one non-transitory machine readable storage medium of Example 19, further comprising instructions that when executed perform: decoding, at the UE, a first value of a higher layer parameter for the first BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP.

Example 22 includes the at least one non-transitory machine readable storage medium of Example 19, further comprising instructions that when executed perform: decoding, at the UE, one or more interrupted radio network temporary identifiers (INT-RNTI) for monitoring of downlink control information (DCI) having a format 2_1.

Example 23 includes the at least one non-transitory machine readable storage medium of Example 19, further comprising instructions that when executed perform: decoding, at the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs; determining, at the UE, from the RRC signal, a selected BWP of the CCs in the cell group for common search space (CSS) monitoring; and identifying, at the UE, interrupted transmission information from the selected BWP that includes the location of the INT indicator for a remaining number of BWPs in the cell group.

Example 24 includes the at least one non-transitory machine readable storage medium of Example 19, further comprising instructions that when executed perform: monitoring, at the UE, one or more type 3 PDCCH common search spaces (CSSs) for a downlink control information (DCI) having a format with a cyclic redundancy check (CRC) scrambled by an interrupted radio network temporary identifier (INT-RNTI).

Example 25 includes the at least one non-transitory machine readable storage medium of Example 19, further comprising instructions that when executed perform: decoding, at the UE, a number of BWPs or a number of component carriers (CCs) and an order of BWPs or an order of CCs in the INT indicator via higher layer signaling, wherein the higher layer signaling is one or more of: minimum system information (MSI); NR remaining minimum system information (RMSI); NR other system information (OSI); or radio resource control (RRC) signaling.

Example 26 includes the at least one non-transitory machine readable storage medium of Example 19, further comprising instructions that when executed perform: decoding, at the UE, one or more BWP indices or one or more component carrier (CC) indices in the INT indicator via radio resource control (RRC) signaling.

Example 27 includes the at least one non-transitory machine readable storage medium of Example 19, further comprising instructions that when executed perform: monitoring, at the UE, a common search space (CSS) within a subset of active BWPs.

Example 28 includes the at least one non-transitory machine readable storage medium of Example 27, further comprising instructions that when executed perform: monitoring, at the UE, the CSS within the subset of active BWPs, wherein the subset of active BWPs is configured by higher layer signaling including one or more of: minimum system information (MSI); NR remaining minimum system information (RMSI); NR other system information (OSI); or radio resource control (RRC) signaling.

Example 29 includes the at least one non-transitory machine readable storage medium of Example 19, further comprising instructions that when executed perform: monitoring, at the UE, one or more reference signals that are spatially quasi-co-located with a control resource set (CORESET) with a search space for a downlink control information (DCI) format with a cyclic redundancy check (CRC) scrambled by cell radio network temporary identifier (C-RNTI).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for interrupted transmission indication, the apparatus comprising:
one or more processors configured to:
decode, at the UE, control information carried by a physical downlink control channel (PDCCH) in a first active bandwidth part (BWP);
identify, at the UE, an interrupted transmission (INT) indicator from the control information in the first active BWP;

determine, at the UE, a location of an INT indicator for a second active BWP from the INT indicator for the first active BWP; and decode, at the UE, a first value of a higher layer parameter for the first BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP; and a memory interface configured to send the INT indicator for the first active BWP to a memory.

2. The apparatus of claim 1, wherein the one or more processors are further configured to:

identify, at the UE, interrupted transmission information for a plurality of active BWPs based on a bitmap from the INT indicator for the first active BWP.

3. The apparatus of claim 1, wherein the one or more processors are further configured to:

decode, at the UE, one or more interrupted radio network temporary identifiers (INT-RNTI) for monitoring of downlink control information (DCI) having a format 2_1.

4. The apparatus of claim 1, wherein the one or more processors are further configured to:

decode, at the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs;

determine, at the UE, from the RRC signal, a selected BWP of the CCs in the cell group for common search space (CSS) monitoring; and identify, at the UE, interrupted transmission information from the selected BWP that includes the location of the INT indicator for a remaining number of BWPs in the cell group.

5. The apparatus of claim 1, wherein the one or more processors are further configured to:

monitor, at the UE, one or more type 3 PDCCH common search spaces (CSSs) for a downlink control information (DCI) having a format with a cyclic redundancy check (CRC) scrambled by an interrupted radio network temporary identifier (INT-RNTI).

6. The apparatus of claim 1, wherein the one or more processors are further configured to:

decode, at the UE, a number of BWPs or a number of component carriers (CC) and an order of BWPs or an order of CCs in the INT indicator via higher layer signaling, wherein the higher layer signaling is one or more of:
 minimum system information (MSI);
 NR remaining minimum system information (RMSI);
 NR other system information (OSI); or
 radio resource control (RRC) signaling.

7. The apparatus of claim 1, wherein the one or more processors are further configured to:

decode, at the UE, one or more BWP indices or one or more component carrier (CC) indices in the INT indicator via radio resource control (RRC) signaling.

8. The apparatus of claim 1, wherein the one or more processors are further configured to:

monitor, at the UE, a common search space (CSS) within a subset of active BWPs.

9. The apparatus of claim 8, wherein the one or more processors are further configured to:

monitor, at the UE, the CSS within the subset of active BWPs, wherein the subset of active BWPs is configured by higher layer signaling including one or more of:
 minimum system information (MSI);
 NR remaining minimum system information (RMSI);
 NR other system information (OSI); or
 radio resource control (RRC) signaling.

10. The apparatus of claim 1, wherein the one or more processors are further configured to:

monitor, at the UE, one or more reference signals that are spatially quasi-co-located with a control resource set (CORESET) with a search space for a downlink control information (DCI) format with a cyclic redundancy check (CRC) scrambled by cell radio network temporary identifier (C-RNTI).

11. An apparatus of a new radio (NR) node B (gNB) operable for interrupted transmission indication, the apparatus comprising:

one or more processors configured to:
 determine, at the gNB for transmission to a user equipment (UE), an interrupted transmission (INT) indicator for a first active bandwidth part (BWP), wherein the INT indicator includes a location of an INT indicator for a second active BWP;
 encode, at the gNB for transmission to the UE, the INT indicator in control information carried by a physical downlink control channel (PDCCH) in the first active BWP;
 encode, at the gNB for transmission to the UE, control information or data information in the second active BWP; and
 encode, at the gNB for transmission to the UE, a first value of a higher layer parameter for the first active BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP; and a memory interface configured to retrieve the INT indicator from a memory.

12. The apparatus of claim 11, wherein the one or more processors are further configured to:

determine, at the gNB, a bitmap in the INT indicator for the first active BWP, wherein the bitmap includes interrupted transmission information for a plurality of active BWPs.

13. The apparatus of claim 11, wherein the one or more processors are further configured to:

encode, at the gNB for transmission to the UE, one or more interrupted radio network temporary identifiers (INT-RNTI) for monitoring of downlink control information (DCI) having a format 2_1.

14. The apparatus of claim 11, wherein the one or more processors are further configured to:

encode, at the gNB for transmission to the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs.

15. The apparatus of claim 11, wherein the one or more processors are further configured to:

encode, at the gNB for transmission to the UE, a number of BWPs or a number of component carriers (CCs) and an order of BWPs or an order of CCs in the INT indicator via higher layer signaling, wherein the higher layer signaling is one or more of:
minimum system information (MSI);
NR remaining minimum system information (RMSI);
NR other system information (OSI); or
radio resource control (RRC) signaling.

16. The apparatus of claim 11, wherein the one or more processors are further configured to:
encode, at the gNB for transmission to the UE, one or more BWP indices or one or more component carrier (CC) indices in the INT indicator via radio resource control (RRC) signaling.

17. At least one non-transitory machine readable storage medium having instructions embodied thereon for interrupted transmission indication, the instructions when executed by one or more processors at a user equipment (UE) perform the following:
decoding, at the UE, control information carried by a physical downlink control channel (PDCCH) in a first active bandwidth part (BWP);
identifying, at the UE, an interrupted transmission (INT) indicator from the control information in the first active BWP;
decoding, at the UE, a first value of a higher layer parameter for the first BWP and a second value of the higher layer parameter for the second active BWP, wherein the first value of the higher layer parameter is separately configured from the second value of the higher layer parameter, and wherein the higher layer parameter includes interrupted transmission information for the first active BWP or the second active BWP; and
determining, at the UE, a location of an INT indicator for a second active BWP from the INT indicator from the first active BWP.

18. The at least one non-transitory machine readable storage medium of claim 17, further comprising instructions that when executed perform:
identifying, at the UE, interrupted transmission information for a plurality of active BWPs based on a bitmap from the INT indicator for the first active BWP.

19. The at least one non-transitory machine readable storage medium of claim 17, further comprising instructions that when executed perform:
decoding, at the UE, one or more interrupted radio network temporary identifiers (INT-RNTI) for monitoring of downlink control information (DCI) having a format 2_1.

20. The at least one non-transitory machine readable storage medium of claim 17, further comprising instructions that when executed perform:
decoding, at the UE, a radio resource control (RRC) signal identifying mapping of component carriers (CCs) to a cell group, wherein each CC in the cell group is scrambled by a single interrupted radio network temporary identifier (INT-RNTI), and wherein each CC includes one or more BWPs;
determining, at the UE, from the RRC signal, a selected BWP of the CCs in the cell group for common search space (CSS) monitoring; and
identifying, at the UE, interrupted transmission information from the selected BWP that includes the location of the INT indicator for a remaining number of BWPs in the cell group.

21. The at least one non-transitory machine readable storage medium of claim 17, further comprising instructions that when executed perform:
monitoring, at the UE, one or more type 3 PDCCH common search spaces (CSSs) for a downlink control information (DCI) having a format with a cyclic redundancy check (CRC) scrambled by an interrupted radio network temporary identifier (INT-RNTI).

22. The at least one non-transitory machine readable storage medium of claim 17, further comprising instructions that when executed perform:
decoding, at the UE, a number of BWPs or a number of component carriers (CCs) and an order of BWPs or an order of CCs in the INT indicator via higher layer signaling, wherein the higher layer signaling is one or more of:
minimum system information (MSI);
NR remaining minimum system information (RMSI);
NR other system information (OSI); or
radio resource control (RRC) signaling.

23. The at least one non-transitory machine readable storage medium of claim 17, further comprising instructions that when executed perform:
decoding, at the UE, one or more BWP indices or one or more component carrier (CC) indices in the INT indicator via radio resource control (RRC) signaling.

24. The at least one non-transitory machine readable storage medium of claim 17, further comprising instructions that when executed perform:
monitoring, at the UE, a common search space (CSS) within a subset of active BWPs.

25. The at least one non-transitory machine readable storage medium of claim 24, further comprising instructions that when executed perform:
monitoring, at the UE, the CSS within the subset of active BWPs, wherein the subset of active BWPs is configured by higher layer signaling including one or more of:
minimum system information (MSI);
NR remaining minimum system information (RMSI);
NR other system information (OSI); or
radio resource control (RRC) signaling.

26. The at least one non-transitory machine readable storage medium of claim 17, further comprising instructions that when executed perform:
monitoring, at the UE, one or more reference signals that are spatially quasi-co-located with a control resource set (CORESET) with a search space for a downlink control information (DCI) format with a cyclic redundancy check (CRC) scrambled by cell radio network temporary identifier (C-RNTI).

* * * * *